United States Patent
Kolam et al.

(10) Patent No.: US 9,471,552 B1
(45) Date of Patent: Oct. 18, 2016

(54) OPTIMIZATION OF SCRIPTING FOR WEB APPLICATIONS

(71) Applicant: Instart Logic, Inc., Mountain View, CA (US)

(72) Inventors: Hariharan Kolam, Palo Alto, CA (US); Raghu Batta Venkat, Palo Alto, CA (US); Fasihullah Askiri, Bengaluru (IN); Brian Kennedy, Mountain View, CA (US)

(73) Assignee: Instart Logic, Inc., Palo Alto, CA (US)

( * ) Notice: Subject to any disclaimer, the term of this patent is extended or adjusted under 35 U.S.C. 154(b) by 523 days.

(21) Appl. No.: 13/665,723

(22) Filed: Oct. 31, 2012

(51) Int. Cl.
*G06F 9/45* (2006.01)
*G06F 17/22* (2006.01)

(52) U.S. Cl.
CPC .................. *G06F 17/2247* (2013.01)

(58) Field of Classification Search
USPC ........................................................ 717/158
See application file for complete search history.

(56) References Cited

U.S. PATENT DOCUMENTS

2005/0120276 A1* 6/2005 Kolawa .............. G06F 11/3684
714/38.1
2009/0292791 A1* 11/2009 Livshits et al. ............... 709/217

\* cited by examiner

*Primary Examiner* — Hang Pan
(74) *Attorney, Agent, or Firm* — Van Pelt, Yi & James LLP

(57) ABSTRACT

A method of reprioritizing execution of a script is disclosed. At least a portion of the script is partitioned into a plurality of component functions. At least one of the plurality of component functions is encapsulated with a wrapper component function. The initial loading of at least one of the plurality of component functions is selectively disabled. A modified script including at least one wrapper component function is generated. In some embodiments, profiling of the plurality of component functions is performed by collecting usage information of the plurality of component functions. In some embodiments, the selective disabling of the initial loading of a component function is based at least in part on the collected usage information of the plurality of component functions.

31 Claims, 6 Drawing Sheets

```
function f1()
{
  function f2 () {
    f2_body();
  }

} function f3()
{
  function f4 () {
    f4_body();
  }

```
function f1'() {
    if(!this['_ins_1']) this['_ins_1'] =
        eval("(function() {\n   function f2() {\n      f2_body();\n   }\n})");
    return this._ins_1.apply(this, arguments);
} function f3'() {
    function f4'() {
        if(!this['_ins_4']) this['_ins_4'] =
            eval("(function() {\n      f4_body();\n   })");
        return this._ins_4.apply(this, arguments);
    }
}
```

String variables

•
•
•

```
function f1'() {window['_ins_1']=true;
    function f2'() {window['_ins_2']=true;
        f2_body();
    }

} function f3'() {window['_ins_3']=true;
    function f4'() {window['_ins_4']=true;
        f4_body();
    }

OPTIMIZATION OF SCRIPTING FOR WEB APPLICATIONS

BACKGROUND OF THE INVENTION

A Web application typically includes a combination of content, for example images or videos, and executable code or script, such as JavaScript. The end-user experience is impacted by the amount of time taken to download the content and the code over the network and by the amount of time taken to load and execute the code. End-user devices such as a smartphone communicating over a cellular network may have less computing resources, and may experience higher network latency, than devices such as a personal computer connected to a wired Ethernet network. Therefore, improved techniques for the delivery of information and for the execution of code corresponding to a webpage would be desirable.

BRIEF DESCRIPTION OF THE DRAWINGS

Various embodiments of the invention are disclosed in the following detailed description and the accompanying drawings.

FIG. 4 is a diagram illustrating an embodiment of a script 400 wherein a portion of script 400 is partitioned into functions f1( ), f2( ), f3( ), and f4( ).

FIG. 6 is a diagram illustrating an embodiment of a modified script 600.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
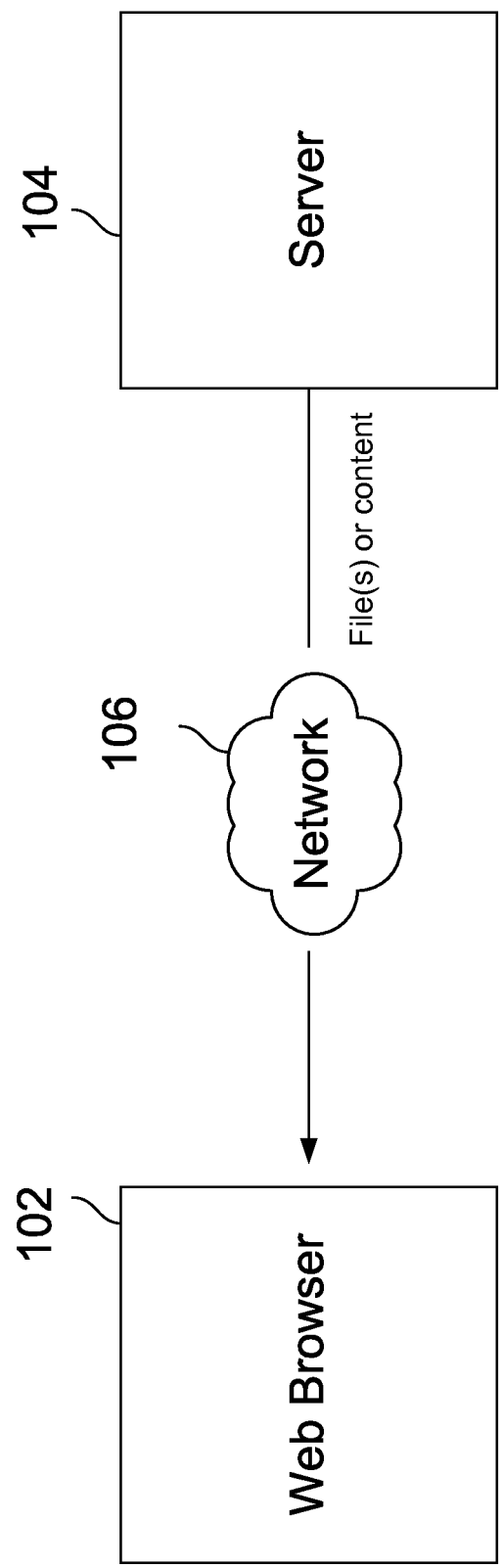
FIG. 1 is a block diagram illustrating an embodiment of a web browser accessing webpages and other information (e.g., webpages and other information for a web application) through a network.

FIG. 1 is a block diagram illustrating an embodiment of a web browser accessing webpages and other information (e.g., webpages and other information for a web application) through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustrative purposes only; accordingly, the present application is not limited to these specific examples.

Figure 2:
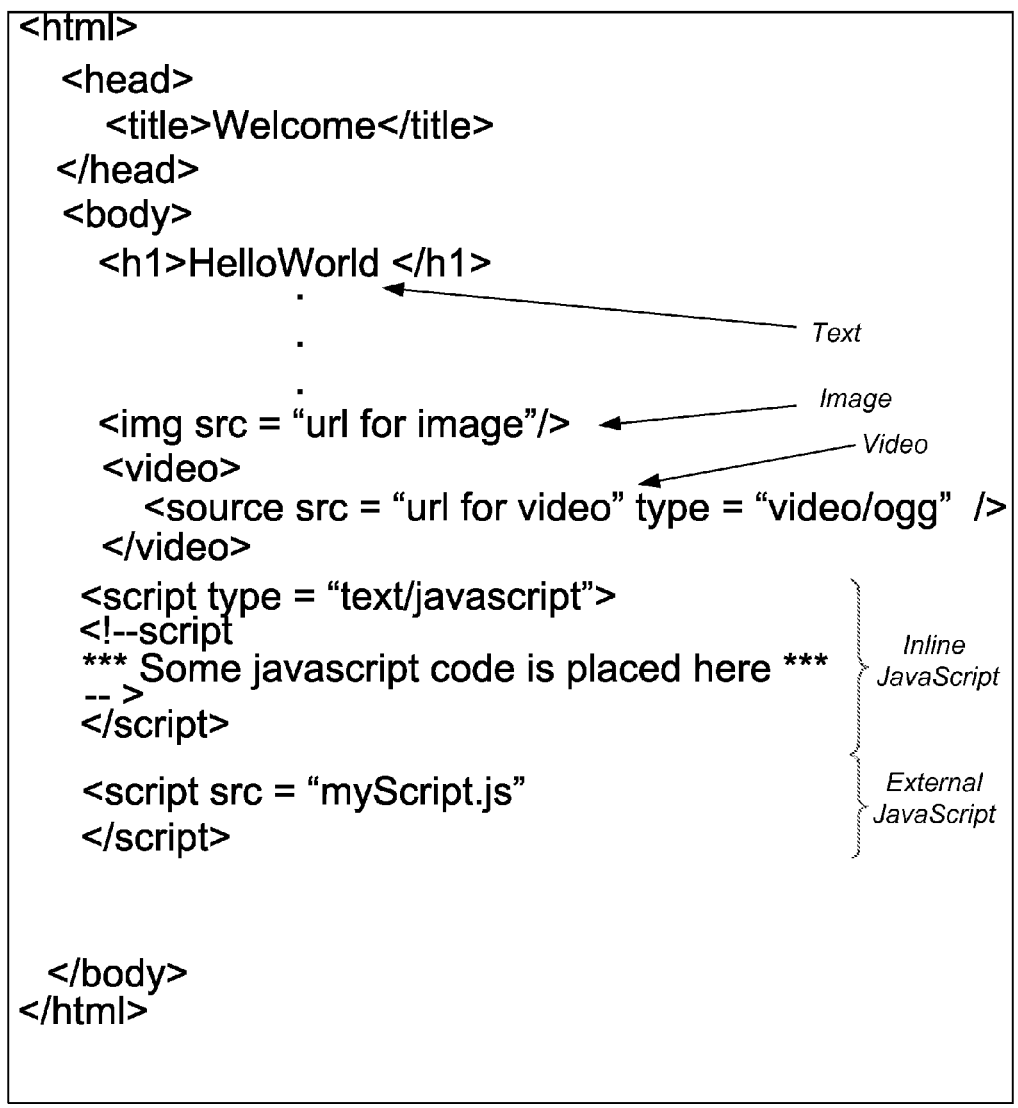
FIG. 2 is a diagram illustrating an embodiment of an HTTP response 200 returning an HTML file.

FIG. 2 is a diagram illustrating an embodiment of an HTTP response 200 returning an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. Web browser 102 then parses the received webpage and begins to process and render the webpage.

As shown in FIG. 2, the HTML file may include text, dependent resources, scripts, and the like. Examples of dependent resources include images, videos, and audio clips. These dependent resources are resources that need to be separately transferred from server 104 or from other servers to web browser 102. For example, as shown in FIG. 2, the list of dependent resources includes an image, which is stored at a location specified by an URL. To display the image on the webpage, web browser 102 sends a separate HTTP request message to the URL, and the image will be returned in a separate HTTP response message from the URL.

The HTML file in FIG. 2 may include one or more scripts for making the webpage dynamic and interactive. For example, scripts may be used to manipulate the webpage's contents and behavior or to respond to end-user actions. As shown in FIG. 2, the <script> tags (i.e., <script> and </script> tags) are used to define a client-side script, such as a JavaScript. A JavaScript may be either inline or external. For inline JavaScripts, the JavaScript code is directly embedded and integrated into the HTML code in FIG. 2. JavaScript code may also be placed in external files. For example, external JavaScript files have the file extension .js. An external JavaScript file may be inserted into the HTML file by specifying a URL for the .js file in the "src" attribute of the <script> tag. The external JavaScript is downloaded from the URL and then executed.

Dependent resources, such as images, videos, and audio clips, are typically large in size; hence, the network load and the time required to download the dependent resources can be significant. The code corresponding to the scripts on a webpage, on the other hand, is often smaller in size. Therefore, the network load for downloading the scripts is relatively light as compared to the network load for downloading the different types of dependent resources. As a result, compressing the JavaScript code, speeding up the downloading of the JavaScript code, or other similar schemes, can bring about only negligible savings in network bandwidth utilization and negligible performance improvement as perceived by the end-users.

However, loading and executing the scripts can consume a significant amount of computing resources, and the end-user may experience a delay until certain scripts or certain portions of the scripts are loaded and executed. Because scripts are often used to handle dynamic actions or respond to end-user actions, different portions of the scripts may only need to be executed at certain times. Therefore, reprioritization of the execution of certain components of the scripts can result in more efficient utilization of the limited amount of computing resources. As will be described in greater detail below, instead of loading and executing a JavaScript as a single monolithic block of code, the semantics of JavaScript may be exploited to reorganize a JavaScript so as to reprioritize the loading and executing of certain components of the JavaScript. The reprioritization of the loading and executing of certain components of the scripts described herein is especially beneficial to compute-constrained devices, such as a smartphone or a tablet, or in the case of computationally intensive web applications.

Figure 3:
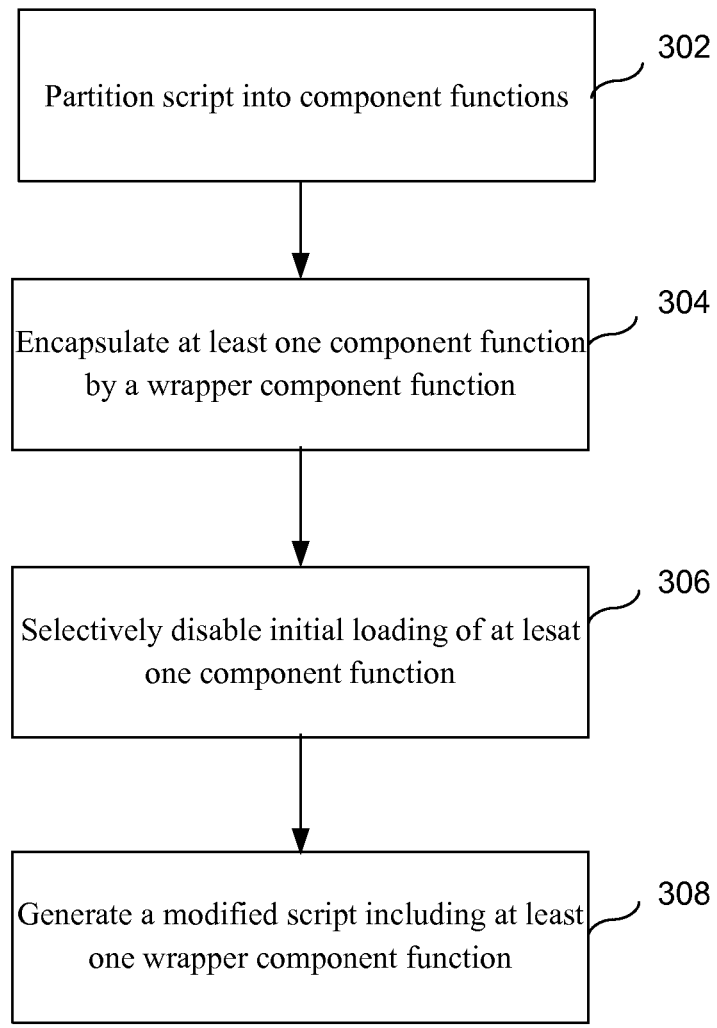
FIG. 3 is a diagram illustrating an embodiment of a process 300 for reprioritizing execution of a script.

FIG. 3 is a diagram illustrating an embodiment of a process 300 for reprioritizing execution of a script. In some embodiments, process 300 is a process that runs on server 104 of FIG. 1. For example, server 104 may reprioritize execution of inline JavaScripts or external JavaScript files included in a webpage by modifying the inline JavaScripts or the external JavaScript files and replacing the original scripts with the modified scripts. The webpage file with the modified scripts is then delivered to a client (e.g., web browser 102 in FIG. 1).

At 302, at least a portion of the script is partitioned into a plurality of component functions. For example, at least a portion of the script may be partitioned into a plurality of logical units, e.g., a plurality of JavaScript functions. FIG. 4 is a diagram illustrating an embodiment of a script 400 wherein a portion of script 400 is partitioned into functions f1( ), f2( ), f3( ), and f4( ). In this illustrative example, function f1( ) includes another function f2( ), and function f3( ) includes another function f4( ).

Figure 5:
FIG. 5 is a diagram illustrating an embodiment of a modified script 500, wherein script 500 includes at least one wrapper component function encapsulating a component function of script 400.

With continued reference to FIG. 3, at least one of the plurality of component functions is encapsulated by a wrapper component function at 304. FIG. 5 is a diagram illustrating an embodiment of a modified script 500, and script 500 includes at least one wrapper component function encapsulating a component function of script 400. As shown in FIG. 5, modified script 500 includes wrapper component functions f1'( ), f3'( ), and f4'( ). Wrapper component function f1'( ) encapsulates component function f1( ) of script 400 in FIG. 4, wrapper component function f3'( ) encapsulates component function f3( ), and wrapper component function f4'( ) encapsulates component function f4( ).

With continued reference to FIG. 3, the initial loading of at least one of the plurality of component functions is selectively disabled at 306. In some embodiments, the initial loading of component functions that have relatively higher odds of not being called at all may be disabled. In some embodiments, the initial loading of component functions that are likely to be called only after a predetermined period of time may be disabled. By selectively disabling the initial loading of the component functions that do not need to be executed upfront, the limited amount of computing resources of a device can be used more efficiently to load and execute the component functions that need to be executed immediately, thereby reducing the delay that is experienced by the end-user of the device.

In some embodiments, code is added to the wrapper component function encapsulating the component function for which the initial loading is disabled. In some embodiments, the added code loads the component function only on demand. For example, as shown in the illustrative example in FIG. 5, the added code may delay the loading of the component function until the component function is actually first called on a client. In this particular example, the initial loading of f1( ) and f4( ) has been disabled because these two functions have been determined by a profiling procedure (described later in the present application) that they are not required to be loaded and executed upfront. The initial loading and executing of f1( ) (and similarly f4( ) is disabled by adding code within wrapper component function f1'( ) to store the code in f1( ) in a string variable. By representing the code of f1( ) as a string variable, the code of function f1( ) does not need to be loaded upfront upon the delivery of the webpage. When function f1 ( ) is eventually called, the JavaScript function eval( ) is used to evaluate the string variable and the evaluated string variable is then loaded and executed as code on demand.

With continued reference to FIG. 3, a modified script is generated including the wrapper component functions. For example, as discussed above, script 500 is a modified script that is generated based on script 400 in FIG. 4, and script 500 includes wrapper component functions encapsulating some of the component functions. In some embodiments, the modified script is cached on server 104. In some embodiments, the modified script may be dynamically generated based on the results from the profiling procedure and user profile data. The modified script is used to replace the original script in the webpage. The webpage file with the modified script is then delivered to a client (e.g., web browser 102 in FIG. 1).

A profiling process may be used to collect usage information of the component functions when a particular webpage is accessed. The usage information is then sent back to server 104 in FIG. 1, and the usage information may be used by server 104 to determine whether the initial loading of a particular component function may be disabled or not.

In some embodiments, the usage information corresponds to a particular user, and the usage information is used to selectively disable the initial loading of certain component functions when the particular user is accessing the webpage. In some embodiments, the usage information corresponds to a group of users. For example, the group of users may be grouped based on geographical locations or other user characteristics, and the usage information is used to selectively disable the initial loading of certain component functions when any of the users in the group is accessing the webpage.

In some embodiments, the usage information includes information indicating the timing of when the component functions are called. For example, timestamps of when the component functions are called may be collected and then sent to server 104. In some embodiments, the usage information includes information indicating the likeliness of a component function being called upfront upon the delivery of the webpage. For example, the likeliness information may be based on whether a component function is called or how many times the component function is called within a predetermined profiling period, e.g., x number of seconds. The measurement of the number of times the component function is called within the predetermined profiling period may be repeated over time to obtain an averaged measurement. In one example, f1( ) and f4( ) may be observed to be both frequently called and among the first component functions to be called, whereas other component functions are called later and less frequently. In this case, the initial loading of all the component functions except f1( ) and f4( ) may be disabled.

FIG. 6 is a diagram illustrating an embodiment of a modified script 600. Script 600 includes a number of wrapper component functions, and code is added to the wrapper component functions for profiling purposes. When a particular component function is called, a variable corresponding to the component function is set to true. For example, when f1( ) is called, variable window['_ins_1'] is set to true. After a predetermined profiling period, e.g., two seconds, all the variables corresponding to all the profiled component functions may be sent as metadata back to server 104 of FIG. 1, and server 104 may use the profiling information to determine which component functions for which the initial loading should be disabled.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of reprioritizing execution of a script, comprising:
    receiving a script that is intended to be sent to and executed by a web browser, wherein the script includes a plurality of component functions; and
    generating, using at least one processor, a modified script on a server to be sent to and executed by the web browser, comprising:
        selecting one or more of the plurality of component functions that will not be initially loaded upon execution of the modified script by the web browser; and
        for each of the selected component functions:
        encapsulating the component function with a wrapper component function, wherein the wrapper component function includes codes that assign a body of the component function to a string variable such that the body of the component function is embedded in the modified script, and wherein the wrapper component function further includes codes that evaluate the string variable and execute the string variable as code in response to the wrapper component function being first called, thereby delaying loading of the body of the component function until the wrapper component function is first called; and
    transmitting the modified script from the server to the web browser, wherein the modified script is executed in the web browser.

2. The method of claim 1, further comprising profiling the plurality of component functions, including collecting usage information of the plurality of component functions.

3. The method of claim 2, wherein the usage information includes information indicating a timing of when component functions are called.

4. The method of claim 2, wherein the usage information includes information indicating a likeliness of a component function being called.

5. The method of claim 2, wherein the usage information corresponds to a user.

6. The method of claim 2, wherein the usage information corresponds to a group of users.

7. The method of claim 2, wherein collecting usage information includes determining whether a component function is called within a predetermined profiling period.

8. The method of claim 7, wherein the determining of whether a component function is called within a predetermined profiling period comprises including code in the wrapper component function encapsulating the component function to increment a counter on a client in response to the component function being called during the predetermined profiling period.

9. The method of claim 7, wherein the determining of whether a component function is called within a predetermined profiling period is repeated over time.

10. The method of claim 2, wherein the selecting of the one or more of the plurality of component functions that will not be initially loaded upon execution of the modified script by the web browser is based at least in part on the collected usage information of the plurality of component functions.

11. The method of claim 1, wherein the codes to evaluate the string variable and execute the string variable as code comprise a JavaScript eval( ) function.

12. The method of claim 1, further comprising replacing the script with the modified script.

13. The method of claim 12, wherein replacing the script with the modified script includes embedding the modified script instead of the script in a webpage.

14. The method of claim 12, wherein replacing the script with the modified script includes providing a location for downloading the modified script instead of providing a location for downloading the script.

15. The method of claim 1, wherein the script comprises a JavaScript.

16. A system for reprioritizing execution of a script, comprising:
    a processor programmed with instructions to:
    receive a script that is intended to be sent to and executed by a web browser, wherein the script includes a plurality of component functions; and
    generate a modified script on a server to be sent to and executed by the web browser, comprising:
        selecting one or more of the plurality of component functions that will not be initially loaded upon execution of the modified script by the web browser; and
        for each of the selected component functions:
        encapsulating the component function with a wrapper component function, wherein the wrapper component function includes codes that assign a body of the component function to a string variable such that the body of the component function is embedded in the modified script, and wherein the wrapper component function further includes codes that evaluate the string variable and execute the string variable as code in response to the wrapper component function being first called, thereby delaying loading of the body of the component function until the wrapper component function is first called;

transmitting the modified script from the server to the web browser, wherein the modified script is executed in the web browser; and a memory coupled to the processor and configured to provide the processor with instructions.

17. The system of claim 16, wherein the memory is further configured to provide the processor with instructions which when executed cause the processor to profile the plurality of component functions, including collecting usage information of the plurality of component functions.

18. The system of claim 17, wherein the usage information includes information indicating a timing of when component functions are called.

19. The system of claim 17, wherein the usage information includes information indicating a likeliness of a component function being called.

20. The system of claim 17, wherein the usage information corresponds to a user.

21. The system of claim 17, wherein the usage information corresponds to a group of users.

22. The system of claim 17, wherein collecting usage information includes determining whether a component function is called within a predetermined profiling period.

23. The system of claim 22, wherein the determining of whether a component function is called within a predetermined profiling period comprises:

including code in the wrapper component function encapsulating the component function to increment a counter on a client in response to the component function being called during the predetermined profiling period; and sending a value of the counter to the system.

24. The system of claim 22, wherein the determining of whether a component function is called within a predetermined profiling period is repeated over time.

25. The system of claim 17, wherein the selecting of the one or more of the plurality of component functions that will not be initially loaded upon execution of the modified script by the web browser is based at least in part on the collected usage information of the plurality of component functions.

26. The system of claim 16, wherein the codes to evaluate the string variable and execute the string variable as code comprise a JavaScript eval( ) function.

27. The system of claim 16, wherein the memory is further configured to provide the processor with instructions which when executed cause the processor to replace the script with the modified script.

28. The system of claim 27, wherein replacing the script with the modified script includes embedding the modified script instead of the script in a webpage.

29. The system of claim 27, wherein replacing the script with the modified script includes providing a location for downloading the modified script instead of providing a location for downloading the script.

30. The system of claim 16, wherein the script comprises a JavaScript.

31. A computer program product for reprioritizing execution of a script, the computer program product being embodied in a tangible non-transitory computer readable storage medium and comprising computer instructions for:

receiving a script that is intended to be sent to and executed by a web browser, wherein the script includes a plurality of component functions; and generating a modified script on a server to be sent to and executed by the web browser, comprising:

selecting one or more of the plurality of component functions that will not be initially loaded upon execution of the modified script by the web browser; and for each of the selected component functions:

encapsulating the component function with a wrapper component function, wherein the wrapper component function includes codes that assign a body of the component function to a string variable such that the body of the component function is embedded in the modified script, and wherein the wrapper component function further includes codes that evaluate the string variable and execute the string variable as code in response to the wrapper component function being first called, thereby delaying loading of the body of the component function until the wrapper component function is first called; and transmitting the modified script from the server to the web browser, wherein the modified script is executed in the web browser.

* * * * *